US00RE41313E

(19) United States
(12) Reissued Patent
Simon

(10) Patent Number: US RE41,313 E
(45) Date of Reissued Patent: May 4, 2010

(54) PLANET PINION CARRIER ASSEMBLY FOR RAVIGNEAUX GEARSET

(75) Inventor: Bernard J. Simon, Troy, MI (US)

(73) Assignee: Ford Global Technologies, LLC, Dearborn, MI (US)

(21) Appl. No.: 11/959,014

(22) Filed: Dec. 18, 2007

Related U.S. Patent Documents

Reissue of:
(64) Patent No.: 6,986,726
Issued: Jan. 17, 2006
Appl. No.: 10/787,397
Filed: Feb. 26, 2004

(51) Int. Cl.
*F16H 57/08* (2006.01)

(52) U.S. Cl. ..... 475/340
(58) Field of Classification Search ..... 475/338, 475/339, 340, 341, 342
See application file for complete search history.

(56) References Cited

U.S. PATENT DOCUMENTS 3,527,121 A 9/1970 Moore
4,003,273 A 1/1977 Miller
4,892,011 A * 1/1990 Nishida et al. ..... 475/159
5,554,082 A 9/1996 Umeyama et al.
5,577,976 A 11/1996 Haka
6,123,640 A * 9/2000 Schulz ..... 475/341
6,434,827 B1 8/2002 Trent
6,986,726 B2 1/2006 Simon
7,155,793 B2 * 1/2007 Simon ..... 29/407.05

FOREIGN PATENT DOCUMENTS

GB 1205009 9/1970
GB 2299836 10/1996
JP 3033538 6/1989

* cited by examiner

*Primary Examiner*—Dirk Wright
(74) *Attorney, Agent, or Firm*—David B. Kelley; MacMillan, Sobanski & Todd, LLC

(57) ABSTRACT

A gearset assembly includes a pinion carrier containing long pinions mutually spaced angularly about an axis and supported for rotation on the carrier, and short pinions, each short pinion supported for rotation on the carrier and meshing with a long pinion. A ring gear meshes with the long pinions. A first sun gear meshes with the short pinions, and a second sun gear meshes with the long pinions.

20 Claims, 7 Drawing Sheets

Prior Art

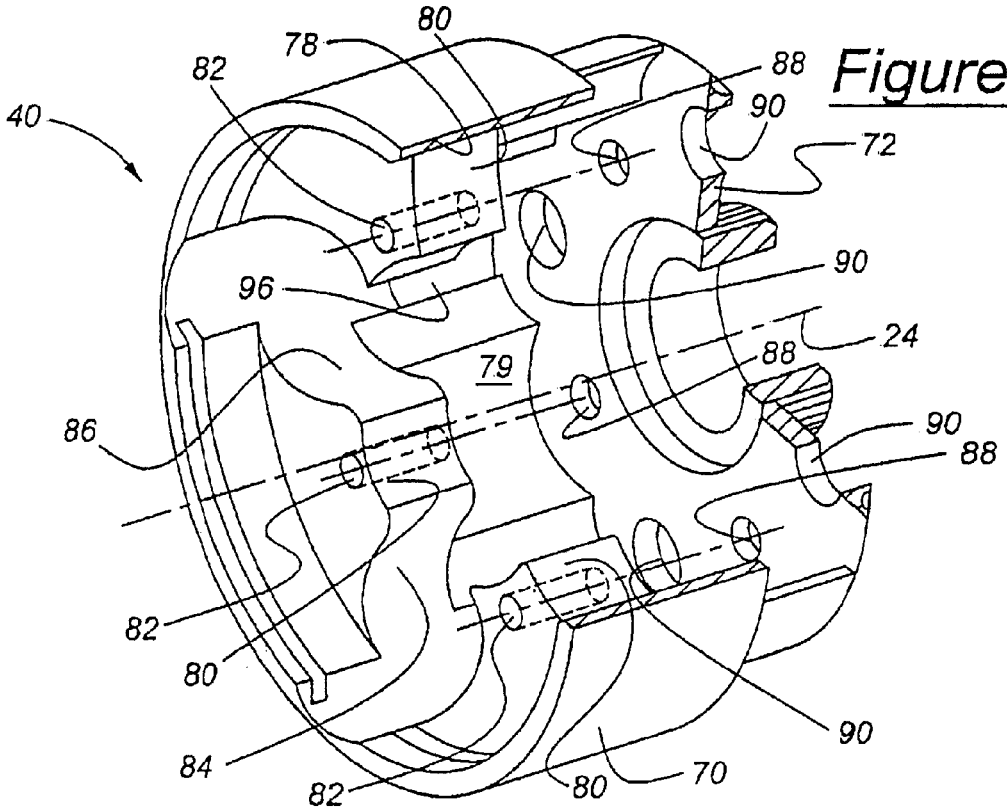
Figure 5
Figure 6
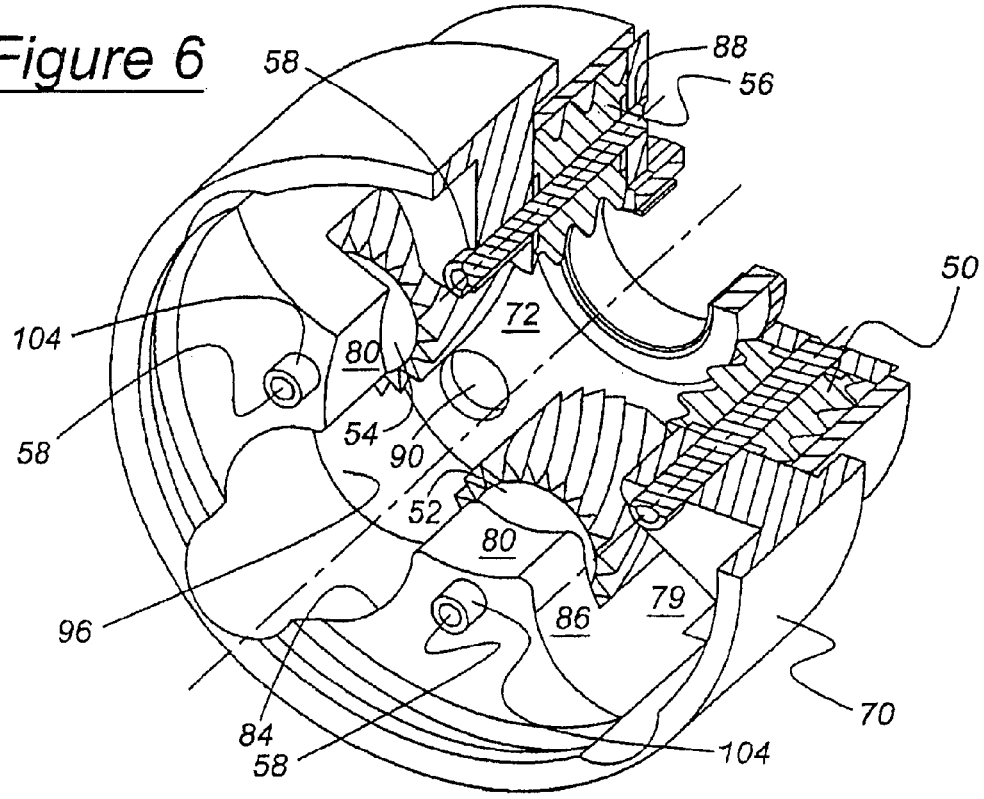

PLANET PINION CARRIER ASSEMBLY FOR RAVIGNEAUX GEARSET

Matter enclosed in heavy brackets [ ] appears in the original patent but forms no part of this reissue specification; matter printed in italics indicates the additions made by reissue.

BACKGROUND OF THE INVENTION

The invention relates to gearsets for motor vehicle transmissions, particular to Ravigneaux gearsets for automatic transmissions.

A conventional Ravigneaux gearset includes a single carrier containing two sets of planet pinions, long pinions, and short pinions. Each pinion set includes three pinions, each pinion being mutually spaced angularly about a central axis, each short pinion meshing with a corresponding long pinion. There are two sun gears, a short sun gear meshing with the three short pinions, and a long sun gear meshing with the three long pinions. There is one ring gear, which meshes with the three long pinions.

Both planet pinion sets are supported for rotation on the carrier. Each long pinion is in mesh with a short pinion, the ring gear, and the long sun gear. Each short pinion is in mesh with a long pinion and the short sun gear.

Ravigneaux gearsets are used in many automatic transmissions due to their compact size. A Ravigneaux gearset can be used instead of two simple planetary gearsets to produce four forward speeds and a reverse gear. They are smaller, and require fewer components than two simple planetary gearsets because they have a common pinion, one ring gear, and one carrier. Their manufacturing and assembly costs compare favorably to those of simple planetary gearsets.

Ravigneaux gearsets, however, are limited in torque capacity due to the pairing requirement for the pinions. Unlike conventional planetary gear sets, which can be made more robust by adding an extra pinion, the pairing requirement of a Ravigneaux gearset requires that two pinions be added to increase torque capacity. Because there is not enough space in the annular zone surrounding the carrier to add a long pinion and a short pinion, the toque and power capacity of a Ravigneaux gearset is usually increased by making the gearset larger, widening the gears and pinions and increasing the diameter of the shafts, or by incorporating premium processes to the manufacture of the gears, pinions and carrier. But this increases the cost weight and package size of the transmission. Heretofore, Ravigneaux gearsets have been limited to three pairs of planet pinions, six pinions.

There is a need to increases the power and torque capacity of a Ravigneaux gearset, preferably by adding pinions, but without increasing the size of the gearset.

SUMMARY OF THE INVENTION

A gearset arranged and sized by the method of this invention increases the power and torque capacity by adding extra sets of pinions to a conventional six-pinion Ravigneaux gearset, each additional pinion set including a long planet pinion and a short planet pinion. Each pinion of the gearset is in meshing engagement with two adjacent pinions. This arrangement improves torque capacity by distributing the torsional load across an extra set of pinions, and by sharing the load across multiple mesh points within the pinions.

In a gearset having one additional short pinion in mesh with the short sun gear, the load on each pinion is reduced by 25 percent. Likewise, there is a 25 percent reduction in load at the long pinion-to-ring gear mesh points. With each short pinion in mesh with two long pinions, the load at each mesh point is reduced by 62.5 percent. The load cycle of all of the gears increases since the number of mesh points increases, but the reduced loading significantly increases gear life and allows the gearset to be used in higher torque applications. This allows existing gear designs to be modified for higher torque applications without affecting packaging. Future designs can likewise be packaged in a smaller space, thereby saving cost and easing packaging constraints on the vehicle.

The eight-pinion Ravigneaux gearset design of this invention has been shown to increase significantly its torque capacity and enables a wider gear ratio to be produced. The wider gear ratio range improves vehicle performance and fuel economy.

A gearset according to the present invention includes a planet pinion carrier, long pinions having external gear teeth, mutually spaced angularly about an axis, and supported for rotation on the carrier, and short pinions having external gear teeth and supported for rotation on the carrier, each short pinion being spaced about the axis, located between two long pinions and meshing with two long pinions.

The carrier includes a disc disposed substantially perpendicular to, and aligned with the axis, having a first set of axially directed, angularly spaced holes, and a second set of axially directed, angularly spaced holes; posts radially spaced from the axis, extending axially from the disc toward the pinions, each post mutually angularly spaced about the axis; and a pad secured to each post, axially spaced from the disc, extending radially toward the axis, and having a axially directed hole aligned with a hole of the second set of holes.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a cutaway isometric view of a planetary pinion carrier for a load sharing gearset with the pinions absent from the carrier;

FIG. 6 is a cutaway isometric view of the carrier of FIG. 5 showing short pinions installed;

DETAILED DESCRIPTION OF THE PREFERRED EMBODIMENT

Figure 1:
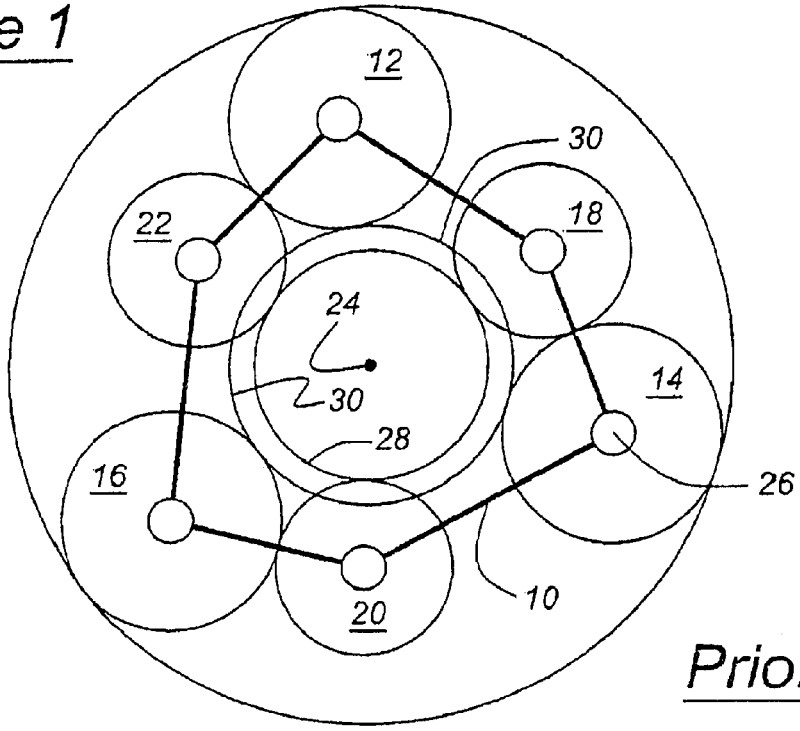
FIG. 1 is an end view of a conventional Ravigneaux gearset.
Figure 2:
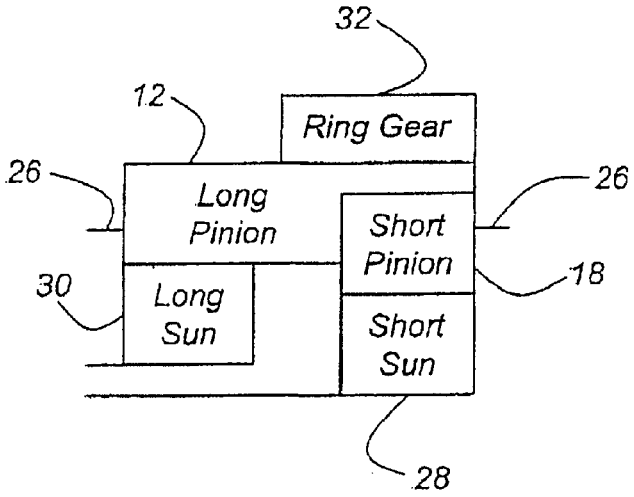
Prior Art Figure 2
FIG. 2 is a front view of the conventional Ravigneaux gearset of FIG. 1.

Referring now to the drawings, there is illustrated in FIGS. 1 and 2a conventional Ravigneaux gearset, which includes a planet pinion carrier 10 containing three pairs of meshing planet pinions having external gear teeth, the pairs being formed of long pinions 12, 14, 16 and short pinions 18, 20, 22. Each pinion pair is equally spaced angularly about a central axis 24 and includes a short pinion meshing with a corresponding long pinion. Each long pinion 12, 14, 16 is supported for rotation on the carrier 10 on a long pinion shaft 26. Each short pinion 18, 20, 22 is supported for rotation on the carrier 10 on a short pinion shaft 27.

There are two sun gears having external gear teeth, a short sun gear 28 meshing with the three short pinions 18, 20, 22, and a long sun gear 30 meshing with the three long pinions 12, 14, and 16. A ring gear 32, surrounding the sun gears and planet pinions and having internal gear teeth, meshes with the three long pinions. The sun gears 28, 30 and the ring gear 32 are arranged coaxially about axis 24.

Each long pinion 12, 14, 16 is in mesh with a short pinion 18, 20, 22, the ring gear 32, and long sun gear 30. Each short pinion 18, 20, 22 is in mesh with a long pinion 12, 14, 16 and the short sun gear 28. Preferably, the gear teeth of each gear and pinion are helical, involute teeth.

There are two sun gears having external gear teeth, a short sun gear 28 meshing with the three short pinions 18, 20, 22, and a long sun gear 30 meshing with the three long pinions 12, 14, 16. A ring gear 32, surrounding the sun gears and planet pinions and having internal gear teeth, meshes with the three long pinions. The sun gears 28, 30 and the ring gear 32 are arranged coaxially about axis 24.

Figure 3:
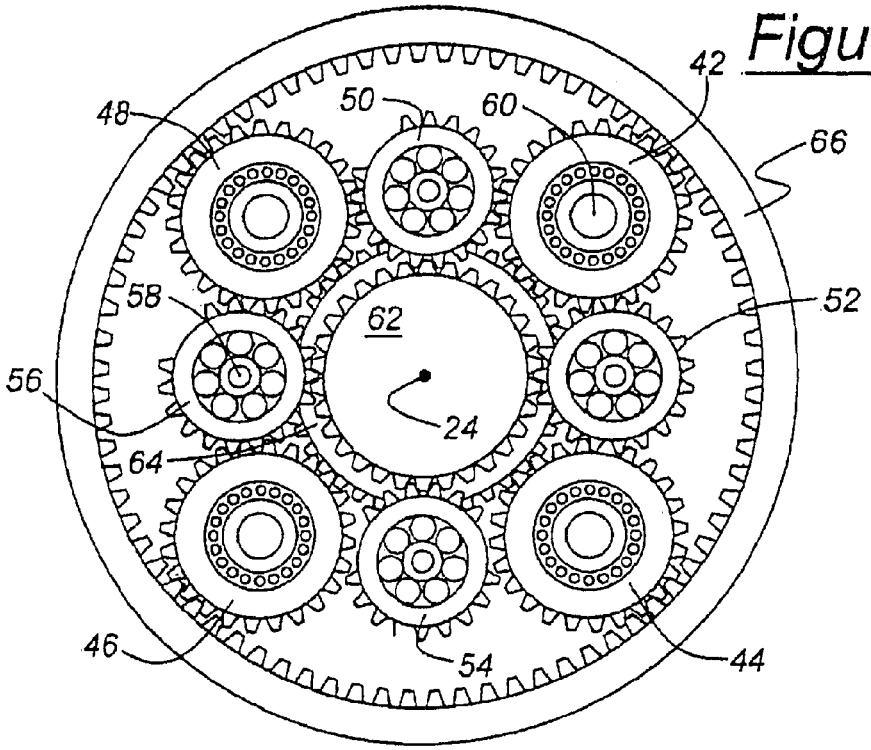
FIG. 3 is an end view of an eight-pinion, load sharing Ravigneaux gearset.

Referring now to FIG. 3, a load sharing gearset 34 according to this invention includes a planet pinion carrier containing two sets of planet pinions, long pinions 42, 44, 46, 48 and short pinions 50, 52, 54, 56, each pinion having external involute gear teeth. Each pinion set includes four pinions, each pinion being mutually spaced angularly about a central axis 24. Each short pinion 50–56 is in meshing engagement with two adjacent long pinions, and is supported on the carrier 40 for rotation on a pinion shaft 58. Each long pinion 42–48 is in meshing engagement with two adjacent short pinions, and is supported on the carrier 40 for rotation on a pinion shaft 60. The pinions are supported on the pinion shafts by needle bearings.

There are two sun gears having external involute gear teeth, a short sun gear 62 meshing with the four short pinions, and a long sun gear 64 meshing with the four long pinions. A ring gear 66, surrounding the sun gears and planet pinions and having internal involute gear teeth, meshes with the four long pinions. The sun gears 62, 64 and the ring gear 66 are arranged coaxially about axis 24.

Each long pinion 42, 44, 46, 48 is in mesh with two short pinions, the ring gear 66, and the long sun gear 64. Each short pinion 50, 52, 54, 56 is in mesh with two long pinions and the short sun gear 62. Preferably the gear teeth of each gear and pinion are helical or bevel gears.

FIGS. 5–10 show a planetary carrier assembly 40 that includes a drum 70, support disc 72, and backing plate 74, each formed preferably of powered metal. To facilitate assembly, the long pinions 42, 44, 46, 48 are inserted in the axial direction into the carrier 40. The drum and support are assembled and secured mutually by brazing to form the subassembly of FIG. 5, the drum 70 and support 72. A backing plate 74 is then installed in the drum-support subassembly.

Drum 70 includes a cylindrical shell 78 and four radially directed carrier posts 79, each post being mutually spaced angularly about axis 24 and extending axially between support disc 70 and a radial extending pad 80. Each pad 80 is formed with an axially directed pinion shaft hole 82, extending through the thickness of the pad, sized and located to receive a short pinion shaft 58 on the pad 80. The lateral surfaces 84, 86 of each pad, which face an adjacent pad, have a partial circular cylindrical form, such that the lateral surfaces of adjacent pads form a pocket 87 surrounding a portion of a long pinion. This arrangement is seen best in FIG. 8.

The support 72 is formed with four axially directed, angularly spaced pinion shaft holes 88, each extending through the thickness of the support, aligned with a hole 82, and sized and located to receive the opposite end of the short pinion shaft 58 that is supported at the aligned hole 82 on the pad 80. Support 72 is also formed with four axially directed, angularly-spaced pinion shaft holes 90, each extending through the thickness of the support, aligned with a cylindrical pocket 87, and sized and located to receive a long pinion shaft 60.

Figure 7:
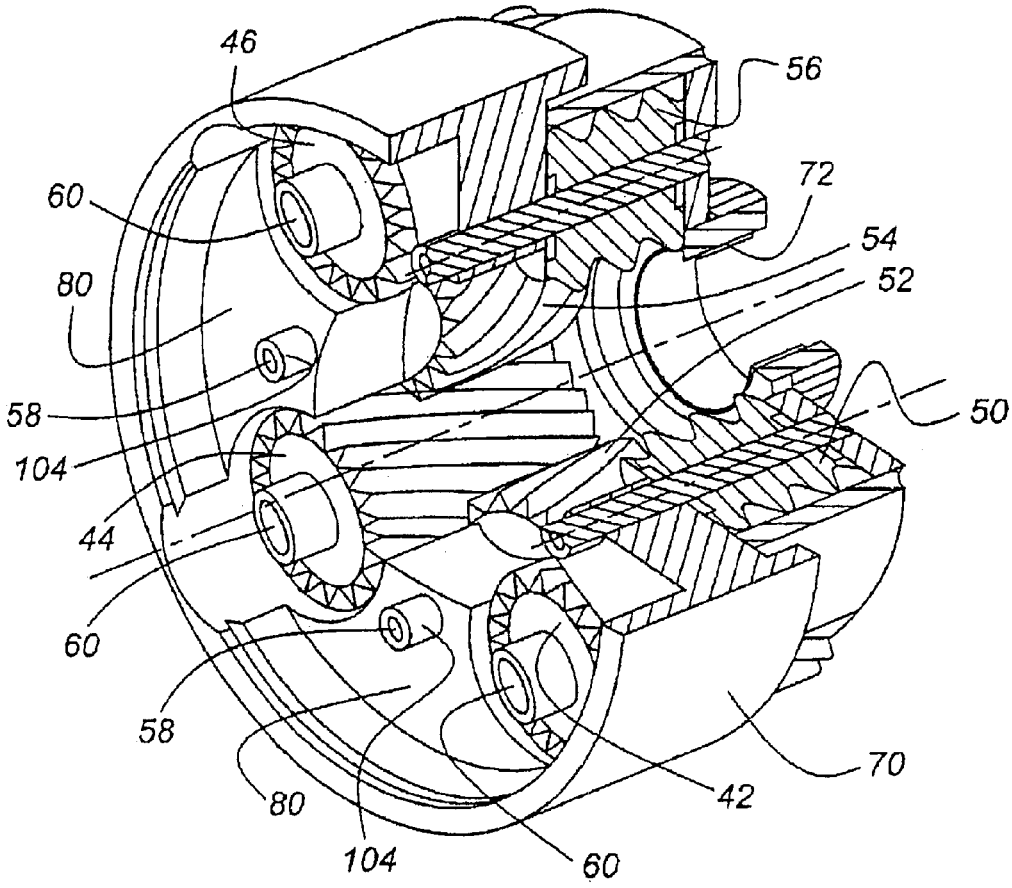
FIG. 7 is a cutaway isometric view of the carrier of FIG. 5 showing short pinions and long pinions.
Figure 8:
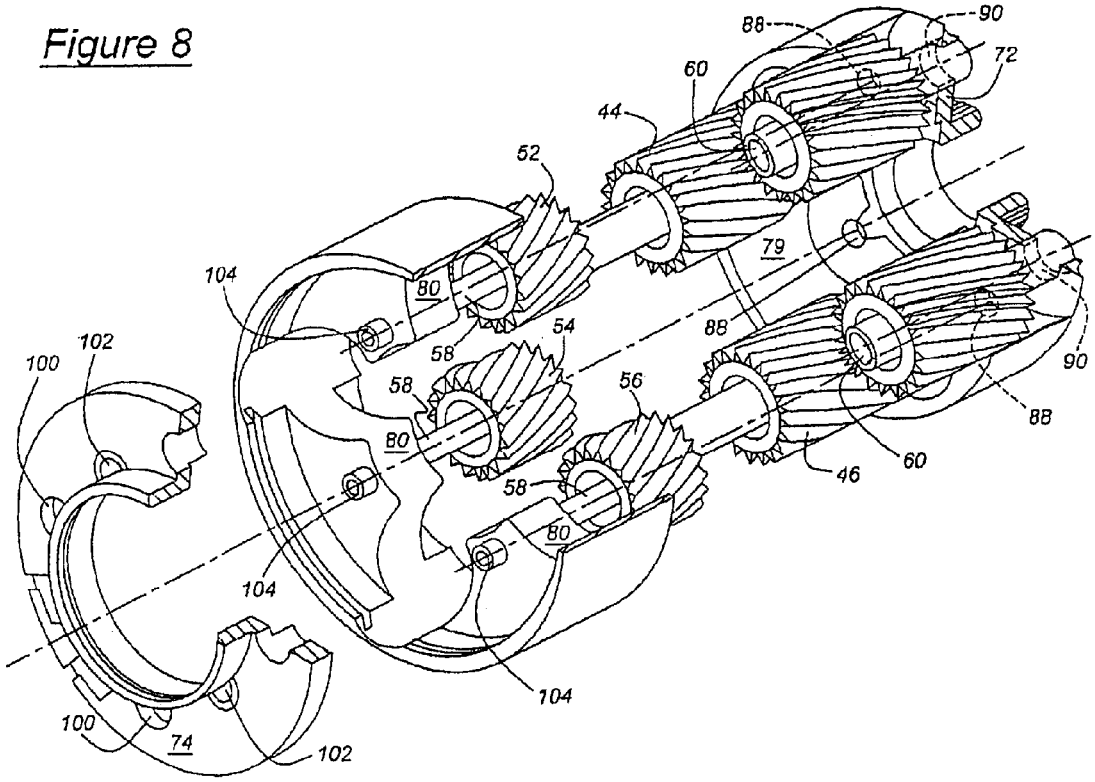
FIG. 8 is a cutaway isometric view of the carrier of FIG. 5 showing short pinions and long pinions installed and the carrier components in mutually spaced relation.
Figure 9:
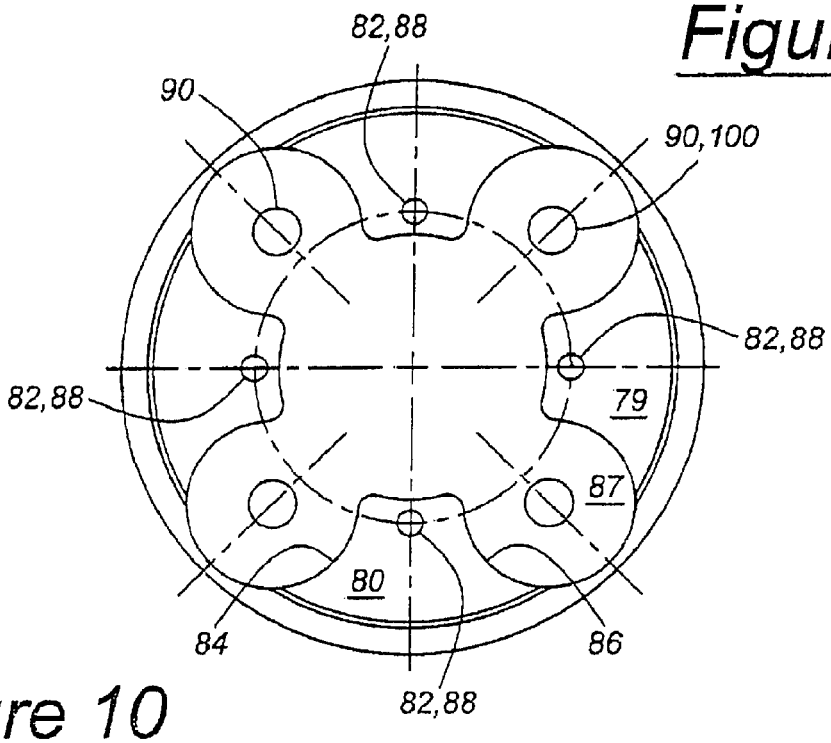
FIG. 9 is an end view of the carrier with the backing plate removed showing the long pinion pockets and the short pinion pads.

FIG. 6 shows two short pinions 52, 54 having been installed in the carrier 40, and supported for rotation on pinion shafts 58 at a hole 82 on a radial pad 80 and at a hole 88 on support 80. The other short pinions 50, 56 are similarly installed and supported. FIG. 7 shows two long pinions 44, 46 having been installed in the carrier 40, and supported for rotation on pinion shafts 60. Long pinion 44 is meshing with short pinions 52, 54; long pinion 46 is meshing with short pinions 54, 56; long pinion 42 is meshing with short pinions 52, 50. The other long pinion 48 is similarly installed and supported. To facilitate assembly of the long pinions in the carrier 40, the long pinions, needle bearings, and pinion shafts 60 are first formed as a subassembly. That subassembly is then inserted axially in the direction from the axial end of the carrier 40 that is opposite support 72, through the cylindrical pockets 27 between adjacent pads 80 of the drum 70, toward support 72. Each pinion shaft 60 engages a hole 90 in the support 72. As the long pinions are inserted in the carrier, they mesh with the short pinions.

A backing plate 98 is inserted into the drum such that the long pinion shafts 60 are supported on the backing plate 98 at angularly spaced holes 100, aligned with the shafts 60. The short pinion shafts 58 are supported on the backing plate 98 at angularly spaced holes 102, aligned with the shafts 58. The backing plate 98 locates onto the carrier assembly 40 using extensions 104 of the short pinion shafts 58. These extensions 104 allow the short pinion 58 to act as locating dowels to guide the backing plate into correct angular position about the axis 24. Backing plate 98 prevents axial movement of the long and short pinion shafts 60, 58, and supports the adjacent end of each long pinion shaft 60. The shafts 60 are secured at each respective end to support disc 72 and backing plate 98, thereby securing disc 72 to plate 98.

Figure 10:
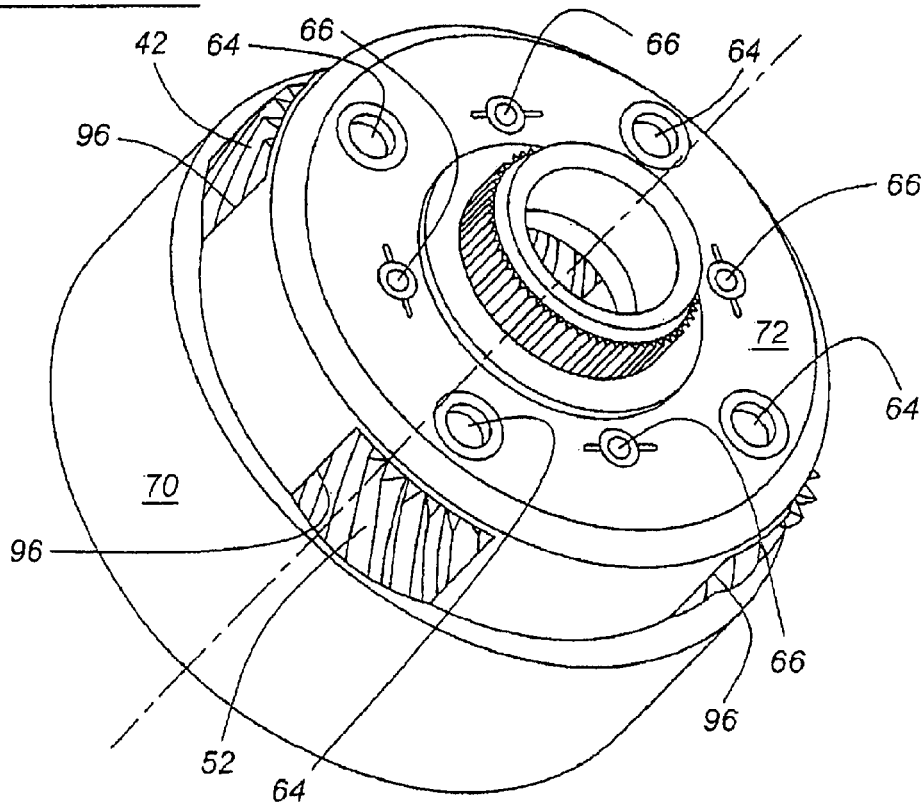
FIG. 10 is an isometric view of the assembled carrier of FIG. 5.

As FIG. 10 shows, four openings 96 extending axially between support 72 and shell 78 and extending circumferentially about axis 24 between the posts are formed on the support 70. The gear teeth on the external surface of each long pinion 42–48 pass through a respective opening 96 so that each the long pinions can mesh with the gear teeth on the internal surface of the ring gear 66.

Figure 4:
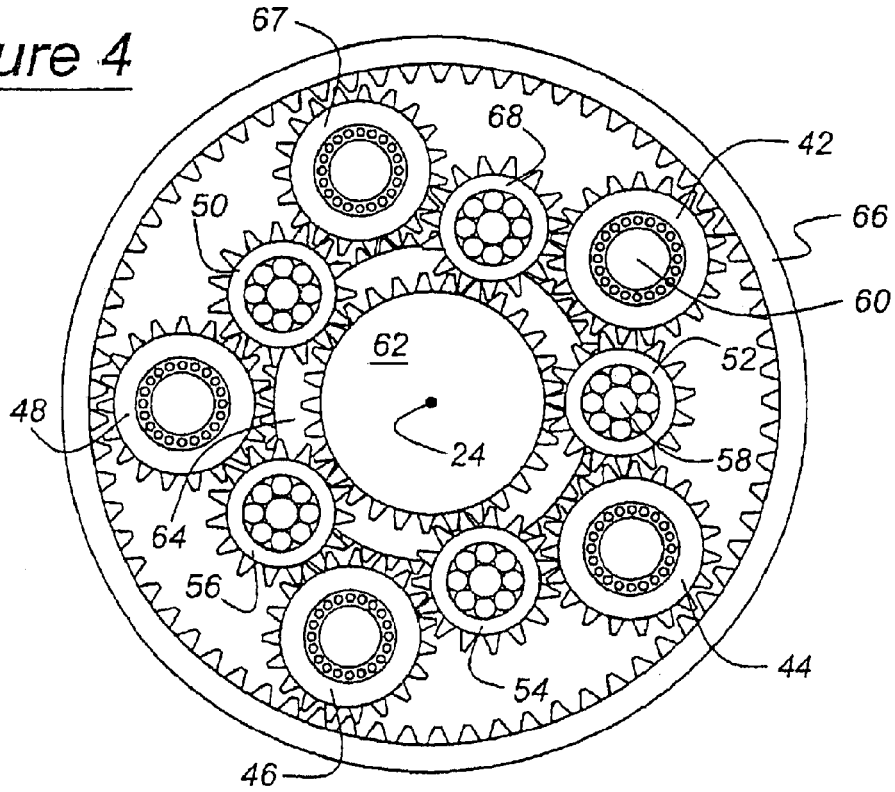
FIG. 4 is a view of a ten-pinion, load sharing Ravigneaux gearset.

The torque capacity of a conventional Ravigneaux gearset can be further increased by adding another yet pair of pinions to the gearset of FIG. 3. FIG. 4 shows a ten-pinion, load-sharing gearset. Due to spatial limitations, the short pinions are made smaller than those of FIG. 3 to provide space for the extra pinion pair and to provide space for the carrier posts 79. The size of the short pinions and torque capacity of the gearset are maximized by positioning the pinions for load sharing. Each short pinion meshes with two long pinions as well as the short sun gear 62. Each long pinion mates with two short pinions, the long sun gear 64, and the ring gear 66. The carrier posts 79 occupy the space between the short pinions and the ring gear.

When designing a conventional Ravigneaux gear set, standard gear design practices can be used to position the gears and design the gear teeth. Often it is sufficient to analyze the gears in mesh-pairs to establish the distance between centers of the gears, i.e., the center distances. When designing an eight-pinion gearset with load sharing, standard design techniques are insufficient; getting all of the gears to mesh properly will be a problem. The most likely outcome will be that seven of the pinions can be positioned in mesh, but the eighth pinion will not assemble. A method for determining the relative positions, center distance and size of gears and pinions, and other gearset parameters of a load sharing gearset that will assemble is described next.

Figure 11:
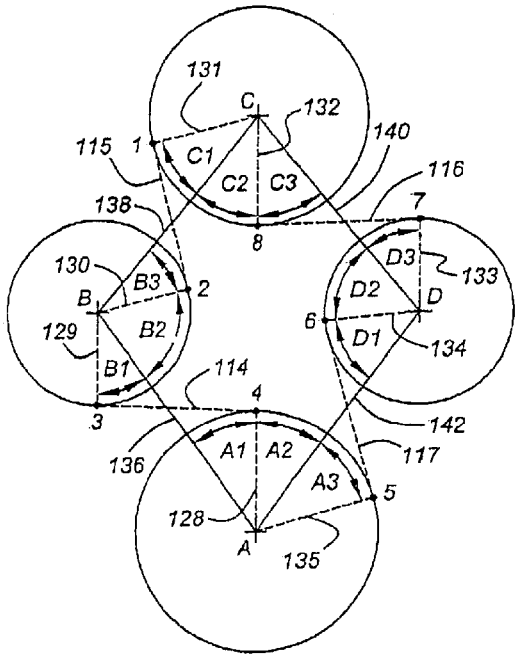
FIG. 11 is a schematic diagram of a portion of load sharing gearset showing a short sun gear, two short pinions and a long pinion in meshing relation.

In FIG. 11, each circle represents the base circle of each gear. Lines 114, 115, 116, 117 are tangential to the base circles and represent the lines-of-action of the various mesh pairs, respectively. Input gear A drives gears B and D, and gears B and D drive output gear C. It is unimportant to the method which gears are designated 'input', 'output', 'driven', or 'driver'. Although gears B and D are located symmetrically with respect to a line connecting the centers of gears A and C, gears B and D need not be positioned symmetrically about that line or have the same size. All gears in the system must have the same ratio of base circle diameter to number of teeth, and all gears have involute gear tooth geometry.

Additional gears can be added to the system incrementally and analyzed in groups of four. Lines 114, 115, 116 and 117 are lines-of-action at gear mesh points. Lines 128, 129, 130, 131, 132, 133, 134, 135 are radial lines on the base circle diameters, each radial line being drawn from a gear center, and each radial line intersecting a corresponding line-of-action 114, 115, 116, 118 at a base circle. Lines 136, 138, 140, 142 connect the centers of the gear base circles.

Each interior angle between a line connecting the centers A, B, C, D and a radial line 128–135 that intersects a line-of-action 114–117 is equal to the transverse pressure angle of the related mesh. For example, angle C1 is the transverse pressure angle of the mesh between gears B and C.

The points of intersection of the lines-of-action 114–117 and the base circle radii 128–135 are numbered 1–8. These points give a common positional reference to any tooth within its mesh cycle with respect to another mesh point on the same gear.

$N_A$, $N_B$, $N_C$, and $N_D$ are the number of teeth on gears A, B, C, and D, respectively. FIG. 11 is a starting layout developed to define center distances and angles.

In order to develop a phase error term, the relative position into the mesh cycle of the meshes on a gear must be determined. If a gear has N equally spaced teeth, then each mesh cycle is 360/N degrees of rotation. A relative position between two mesh cycles on the same gear can be derived using the intersection of the lines of action 114–117 and the base circle radii as a reference. Using gear C in FIG. 11 as an example, suppose the mesh between gear pair B–C is positioned such that the involute of a tooth on gear C is at the point 1, the intersection of a radius of the base circle C and the line of action 115. As a reference, point 1 is zero degrees into the mesh cycle.

What is the position of a tooth on gear C in its the mesh cycle for the CD mesh? The teeth on gear 112 are spaced $360/N_C$ degrees apart. A phase into the mesh cycle is the difference between the angular distance between point 1 and point 8, i.e., angle C1+C2, and an integral multiple of the tooth spacing on gear C:

$$\mathrm{Pos}_{1-8} = \mathrm{Pos}_1 + \mathrm{mod}\left(\mathrm{C1} + \mathrm{C2}, \frac{360}{\mathrm{N_C}}\right) \tag{1}$$

$\mathrm{Pos}_1$ is the relative starting position (assumed, but not required to be zero). The relative position of the mating tooth on gear D into its mesh cycle is:

$$\mathrm{Pos}_{1-9} = \mathrm{Pos}_{1-8}\frac{\mathrm{N_C}}{\mathrm{N_D}} = \mathrm{Pos}_1 + \frac{\mathrm{N_C}}{\mathrm{N_D}}\mathrm{mod}\left(\mathrm{C1} + \mathrm{C2}, \frac{360}{\mathrm{N_C}}\right) \tag{2}$$

There now exists the ability to calculate the position of any tooth into its mesh cycle through two distinct paths among the gears. The position of the teeth on gear C into the mesh pair C–D can be calculated using Equation (1), and that position can be calculated with reference to the path in the opposite direction from gear B to gear A to gear D, as expressed in Equation (3):

$$\mathrm{Pos}_{1-8} = \left(\left(\left(\mathrm{Pos}_1\frac{\mathrm{N_C}}{\mathrm{N_B}} + (\mathrm{B1}+\mathrm{B2})\right)\frac{\mathrm{N_B}}{\mathrm{N_A}} - (\mathrm{A2}+\mathrm{A3})\right)\frac{\mathrm{N_A}}{\mathrm{N_D}} + (\mathrm{D2}+\mathrm{D3})\right)\frac{\mathrm{N_D}}{\mathrm{N_C}} \tag{3}$$

Taking the difference between Equation (1) and Equation (3), and using the Mod function to express it in mesh cycles generates an error term:

$$\mathrm{Error} = \mathrm{mod}\left(\left(\left(\left(Pos_1\frac{\mathrm{N_C}}{\mathrm{N_B}} + (\mathrm{B1}+\mathrm{B2})\right)\frac{\mathrm{N_B}}{\mathrm{N_A}} - (\mathrm{A2}+\mathrm{A3})\right)\frac{\mathrm{N_A}}{\mathrm{N_D}} + (\mathrm{D2}+\mathrm{D3})\right)\frac{\mathrm{N_D}}{\mathrm{N_C}} - (\mathrm{C1}+\mathrm{C2}-\mathrm{Pos}_1), \frac{360}{\mathrm{N_C}}\right) \tag{4}$$

The angular distances A2+A3 and C2+C3 are subtracted because gears A and C rotate opposite the direction of rotation of gears B and D. The starting position $\mathrm{Pos}_1$ subtracts out, so Equation (4) can be simplified into Equation (5):

$$\mathrm{Error} = \mathrm{mod}\left(\left(\left((\mathrm{B1}+\mathrm{B2})\frac{\mathrm{N_B}}{\mathrm{N_A}} - (\mathrm{A2}+\mathrm{A3})\right)\frac{\mathrm{N_A}}{\mathrm{N_D}} + (\mathrm{D2}+\mathrm{D3})\right)\frac{\mathrm{N_D}}{\mathrm{N_C}} - (\mathrm{C1}+\mathrm{C2}), \frac{360}{\mathrm{N_C}}\right) \tag{5}$$

The next step, modifying one or more dimensions until the error term is acceptably low, is best achieved with the use of a computer program or a spreadsheet. A minimal set of design constraints can be developed, and then the remainder of the dimensions can be calculated. For example, the following set of design inputs is sufficient to calculate all distances and angles for the system in FIG. 11:

1) Tooth counts and base-circle diameters for all four gears.

2) Angle BAD

3) Distances AB, AD, and AC

The remaining distances and angles can be calculated from the above inputs. The phase error function can then be calculated. The error function can then be driven to zero by incrementally adjusting one of the inputs. In the above example, distance AC could be the adjustment. It is important to realize that there will be multiple solutions for each set of conditions. In the above example, there will be several distances AC that drive the error to zero. In addition, modifying the inputs can generate new sets of solutions. For example, simply changing distances AB and/or AD will produce a new set of solution (with distance AC as the adjustment). Tooth counts can also be changed to yield a new layout.

An numerical example of an application of the method is described next with reference to FIG. 11.

Develop Gear Ratios and Tooth Counts

To design a load sharing Ravigneaux gearset, first the desired gear ratios to be produced by the gearset must be determined. The gear ratios are determined by conventional means and are used to determine the number of teeth for both sun gears 62, 64, the long pinions 42, 44, 46, 48, and the ring gear 66. For equal spacing between like pinions, the tooth counts must also satisfy the following conditions:

$$\frac{N_R + N_{shortSun}}{\#\ ShortPinions} = \text{Integer} \tag{6}$$

$$\frac{N_R + N_{LongSun}}{\#\ LongPinions} = \text{Intege} \tag{7}$$

In Equations (6) and (7), N is the number of teeth on the respective gear (ring gear, long sun, etc.).

The gear ratios and the requirements imposed by equal spacing among the short and long pinions are used to determine the number of teeth for all gears except the short pinion. For example, suppose it is desired to build an eight-pinion gearset to produce the following gear ratios: 2.92, 1.57, 1.0, 0.71, and −2.4 (four forward gear ratios and one reverse). The following tooth counts would produce such ratios:

$N_{Ring}$=79

$N_{LongSun}$=33

$N_{ShortSun}$=27

The gear ratios are calculated from the following equations using the selected number of teeth for the sun gears and ring gear to demonstrate that the required gear ratios will be produced. Unity is always available as a gear ratio regardless of the size of the sun gears and ring gear by locking the gearset.

$$\frac{N_R}{N_{ShortSun}} = 2.92$$

$$\frac{N_R \frac{N_{LongSun}}{N_{ShortSun}} + N_R}{N_R + N_{LongSun}} = 1.57$$

$$\frac{N_R}{N_R + N_{LongSun}} = 0.71$$

$$-\frac{N_R}{N_{ShortSun}} = -2.39$$

The number of teeth on the long pinion can also be determined from Equation (8).

$$N_{LongPinion} = \frac{N_{Ring} - N_{LongSun}}{2} = 23 \tag{8}$$

It is not necessary to use Equation 8 to determine the long pinion tooth counts. Alternate methods exist and they are equally acceptable and immaterial to the positioning algorithm. The number of teeth for all gears and pinions is determined except for the short pinion.

Define Gear Parameters

Conventional methods are used to develop basic parameters and center distances. For example, suppose it is desired to design a gearset whose pinions and gears have the number of teeth mentioned above, a module of 1.66, a helix angle of 22 degrees, and a minimum gear pair backlash of 25 microns. Standard gear pair center distances can be calculated with the following equation:

$$D = \frac{(N_1 + N_2) * \text{Module}}{2 * \cos(\text{HelixAngle})} \tag{9}$$

Using Equation (9), the standard center distance between the long sun gear 64 and each of the long pinions 42, 44, 46, 48 is 50.130 mm. A set of base circles is also developed. The positioning method does not require the actual base circles, but any set of circles that follows the relationship:

$$\frac{N_1}{B_1} = \frac{N_2}{B_2} \tag{10}$$

for the entire set, wherein N is the number of teeth, and B is the base circle diameter, mm. Irrational values (extremely large or negative) may create computational problems, so it is best to use realistic values. For this example, a ring gear base circle diameter of 127 mm. is selected as an appropriate first assumption. The base circle diameter is selected large enough to provide sufficient circumferential length to accommodate the 79 teeth of the ring gear with a realistic pressure angle. Pressure angles are typically 16–22 degrees for planetary gearsets. Once the center distances are established, the base circle size can be changed to target a desired pressure angle without affecting assembly.

Define the Short Pinion

FIG. 5 is a subset of the gearset of FIG. 3 or FIG. 4, although it is discussed here with reference to FIG. 3. Gear A is the forward sun gear 62. Gears B and D are short pinions 50, 52. Gear C is a long pinion 42. The circles shown are the base circles for these pinions and the gear. The lines 114, 115, 116, 117 are tangential to the base circles and represent the lines-of-action of the various mesh pairs. Distances AB (short sun to short pinion) and BC (short pinion to long pinion) are calculated using trial values of the number of teeth of the short pinions B and D. This can easily be accomplished with a spreadsheet:

| | Short Pinion Tooth Count | |
|---|---|---|
| | 16 | 17 |
| Distance - Short Pinion to Forward Sun | 38.49 | 39.39 |
| Distance - Short Pinion to Long Pinion | 34.91 | 35.81 |
| Angle BAC | 44.01 | 45.21 |

The pinions are equally spaced about the sun gears, and Equations 1 and 2 assume this equal spacing. This assumption infers that angle BAD is 90 degrees (or A1+A2=90°).

Further, for equal torsional loading of each short pinion-long pinion mesh, and equal wear among the pinions, the layout must be symmetric. This infers that BC=CD and AB=AD. From symmetry, Angle BAD=2*Angle BAC. But this is not the case with either a 16 tooth short pinion (2*BAC=88.02°) or a 17 tooth short pinion (2*BAC=90.42°).

It is often beneficial (but not necessary) to select a short pinion tooth count that produces an angle BAC as close to the desired result as possible. In this case, a 17 tooth short pinion is more desirable than a 16 tooth short pinion.

Calculate Phase Error

The gear teeth create a repeating pattern about the circumference of the gear. This pattern repeats every mesh cycle, i.e., 360/N degrees, where N is the number of teeth. Mesh cycle can be used to track the relative positions of any mating gears. Equation 11 governs the positions of mating gears:

$$\Theta 1*N1=\Theta 2*N2 \tag{11}$$

wherein Θ is the angular rotation of gears 1 and 2, respectively. If one gear rotates one mesh cycle, a mating gear will also rotate one of its own mesh cycles. Two mesh engagements on the same gear are related mutually based on angular spacing relative to incremental counts of mesh cycles: two mesh engagements on a gear, spaced an integral number of mesh cycles apart, will be in the same relative position within their cycles, i.e., they will be in phase. Other phasings can be calculated using the Mod function.

The phasing must be calculated using lines tangential to the base circles of gear pairs in mesh. Such tangential lines must be of the same hand for any particular gear. Lines of Action fit this condition. As an exception, lines connecting the centerlines of mating gears can be used if two identical gears are each in mesh with a third gear. For consistency, lines of action are used for calculating mesh cycles.

Figure 12:
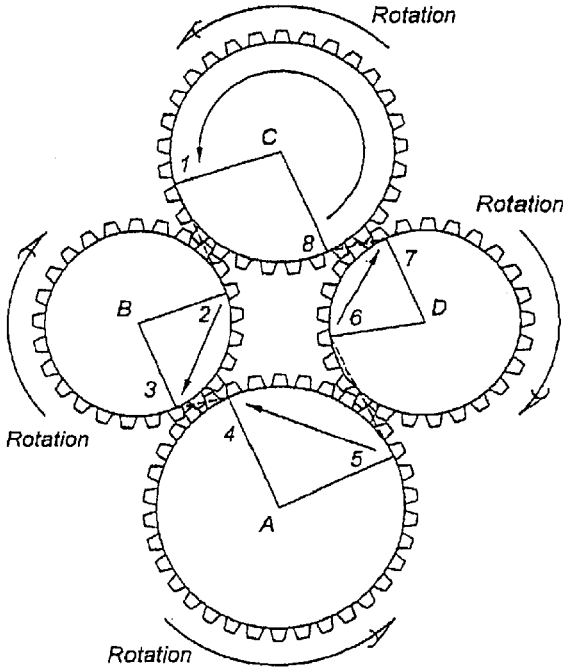
FIG. 12 is a schematic diagram similar to that of FIG. 11.

Referring to FIG. 11, if line AD 142 is arbitrarily picked as position 0 for the mesh cycles between the sun gear A and pinion D, then the phase of the mesh cycle at the mesh between sun gear A and pinion B (AB) relative to the mesh cycle of the mesh between sun gear A and pinion D (AD) can be calculated along two paths. First, calculate the phase of the mesh cycle based on the drive path through angle A2+A3. Second, calculate the phase of the mesh cycle based on the drive path through angles D2+D3, C1+C2, and B1+B2. FIG. 12 shows the directions of rotation of the gears, and the two drive paths, which are referenced in the following calculations of the phase of the mesh cycle. For the gearset to assemble and all of the gears to mesh properly, the phasing calculated by both methods must be equal or approximately equal. Calculating the difference between the two paths generates an error term that is used to change the current gearset parameters and determine the optimal gearset parameters that will permit the gearset to assemble and all the gears to mesh properly.

Before calculating the error term, it is useful to summarize the known values and relationships:

TABLE 1

| | | | | |
|---|---|---|---|---|
| Module | 1.66 | | | |
| Helix Angle | 22 | | | |
| Gear | Tooth Count | Base Circle Radius | | |
| Ring | 79 | 63.50 | Angle BAD | 90.41433 |
| Forward Sun | 27 | 21.70 | Angle ABC | 83.47502 |
| Reverse Sun | 33 | 26.53 | Angle ADC | 83.47502 |
| Long Pinion | 23 | 18.49 | Angle BCD | 102.6356 |
| Short Pinion | 17 | 13.66 | | |
| | | | Angle B1 | 26.11488 |
| | | | Angle B3 | 26.11488 |
| | | | Angle D1 | 26.11488 |
| Center Distances | | | Angle D3 | 26.11488 |
| Forward Sun to Short Pinion | | 39.38809 | | |
| Short Pinion to Long Pinion | | 35.80735 | Angle A2 + A3 | 90.41433 |
| Forward Sun to Long Pinion | | 50.13029 | Angle B1 + B2 | 83.47502 |
| | | | Angle C1 + C2 | 102.6356 |
| | | | Angle D2 + D3 | 83.47502 |

Although Angles B1, B3, D1, and D3 are equal, they need not be equal, and likely will not be equal when the method is completed.

Phase across path 1:

$$\text{Phase}_1 = \text{Mod}\left(\angle A2A3, \frac{360}{N_{\text{ForwardSun}}}\right) = 10.4143$$

$$360/N_{\text{ShortSun}} = 13.333°/\text{tooth}\ \angle A2A3 = 90.41433$$

$$(90.41433/13.333) = 6.7810\ \text{teeth}$$

$$(0.7810*13.333) = 10.4143°$$

Phase Across path 2:

$$\text{Phase}_2 = \text{MOD}\left(\left(\left(\angle B1B2\frac{N_{SP}}{N_{LP}} + 360 - \angle C1C2\right)\frac{N_{LP}}{N_{SP}} + \angle D2D3\right)\frac{N_{SP}}{N_{\text{FwdSun}}}, \frac{360}{N_{\text{FwdSun}}}\right)$$

$$\text{Phase}_2 = \text{MOD}\left(\left(\left(83.475\frac{17}{23} + 360 - 102.6356\right)\frac{23}{17} + 83.475\right)\frac{17}{24}, \frac{360}{27}\right) = 4.353$$

The angles used are those that are in the same direction as the direction of rotation of the corresponding gear. For example, if sun gear A is arbitrarily assigned a counterclockwise rotation, the angles used in the error calculation are the interior angles for all gears except the long pinion C (hence the 360-Angle BCD term). If sun gear A were arbitrarily assigned a clockwise rotation, the opposite would hold true, and the result would be equally valid.

$$\text{Error}=\text{Phase}_1-\text{Phase}_2=10.4143-4.353=6.06$$

The error value for this layout does not equal zero and is not acceptable close to zero. This indicates that the gear arrangement will not assemble. To modify the layout such that it will assemble, one or more of the values in Table 1 require adjustment. To create a symmetric layout of pinions about the sun gear A, angle BAD must be 90 degrees, as discussed above. To keep the gear ratios constant, the gear tooth counts should not be changed. Also, because of the symmetry requirement, the relationships AB=AD and CB=CD will be maintained. With these constraints established, different values of AB and CB can be investigated until the error term is zero or acceptable close to zero. For this example, only distance A–B, the center distance between short sun gear A and short pinion B is adjusted. With the constraint that angle BAD=90 degrees, CB, the center distance between long pinion C and short pinion B will be a calculated value (BAC=45 degrees, AC is known & fixed).

TABLE 2

| Module 1.66<br>Helix Angle 22 | | |
|---|---|---|
| Gear | Tooth Count | Base Circle Radius |
| Ring | 79 | 63.50 |
| Forward Sun | 27 | 21.70 |
| Reverse Sun | 33 | 26.53 |
| Long Pinion | 23 | 18.49 |
| Short Pinion | 17 | 13.66 |
| Angle BAD | 90 | |
| Angle ABC | 85.5 | |
| Angle ADC | 85.5 | |
| Angle BCD | 99 | |
| Angle B1 | 22.34097 | |
| Angle B3 | 25.27978 | |
| Angle D1 | 22.34097 | |
| Angle D3 | 25.27978 | |
| Angle A2 + A3 | 90 | |
| Angle B1 + B2 | 82.5612 | |
| Angle C1 + C2 | 99 | |
| Angle D2 + D3 | 88.4388 | |
| Center Distances | | Notes |
| Short Sun to Long Pinion | 50.130295 | Fixed |
| Angle BAD | 90 | Fixed |
| Short Pinion to Long Pinion | 35.557082 | Calculated |
| Short Sun to Short Pinion | 38.237248 | Adjusted |
| Path 1 | 10.0000 | Calculated |
| Path 2 | 10.0000 | Calculated |
| Error | 2.332E-08 | Calculated |

After changing the current gearset parameters in this way, the calculated error becomes 2.332 E-08, indicating that paths 1 and 2 are substantially equal. The values in Table 2 can be used to produce an eight-pinion Ravigneaux gearset with load sharing as diagrammed in FIGS. 3 and 8. The layout is symmetric for load sharing, and the gears will assemble and mesh properly. Even though only four gears were analyzed out of eleven total (four short pinions, four long pinions, one short sun gear, one long sun gear, and one ring gear), the entire gearset will assembly because it is symmetric, evenly spaced, and the tooth counts all satisfy the constraints for an evenly spaced set of pinions (Equations 1 & 2).

In the numerical example, a single pair backlash of 25 microns was selected, although the selected magnitude of single pair backlash may vary depending on its compatibility with manufacturing capabilities and other factors. If the magnitude of the error is equal to or greater than this backlash, the gears and pinions of the gearset may be too tightly spaced. In service, a drive flank of a first gear at one mesh may be in contact with its mating second gear, and a coast flank of the first gear at another mesh may be in contact with a mating third gear. This condition is avoided when the magnitude of the error is less than the magnitude of the selected single pair backlash.

If the physical dimensions of the gearset are symmetric about line AC, i.e., gears B and D are dimensionally identical, AB=AD, BC=BD, and angle BAD is an integral factor of 360, then the design can be repeated about gear A. For example, if angle BAD is 90 degrees, then four gears identical to B and D can be placed 90 degrees apart about the center of gear A at a radial distance AB from the center of gear A, or four gears identical to C can also be place 90 degrees about the center of gear A at radial distance AC. This layout can be used to generate a multi-pinion Ravigneaux gearset with load sharing among the pinions by placing all gears B and C on a carrier that rotates about the center of gear A.

Driving the solution to a value of phase error other than zero can bias the load sharing. In the example above with AC as the adjustment, a slightly positive phase error would imply no contact between gears C and D under nominal loads. Since gear teeth deflect under load, a nominal gap could be targeted such that load sharing does not occur until a certain load threshold is achieved. Backlash in the system would have to be increased to account for this additional 'forward lash'. With this type of biasing, a torque reversal will cause the primary torque path to switch.

The gearset could also be biased with non-symmetry. If gears B and D are identical but distances CD and BD are not the same, one mesh pair will have additional backlash. That increased backlash could then be used for a 'forward lash' to bias the torque path. In this case, the primary torque path would not necessarily change if the load through the system reversed.

To address the inherent limitations for adding pinions to a Ravigneaux gearset, an additional pair of long and short pinions was added to a conventional gearset. To maximize pinion size, each pinion is in mesh with both adjacent pinions. Each short pinion meshes with two long pinions, and each long pinion meshes with two short pinions. This load sharing increases the service life of the gearset by reducing the bending stress of the pinion teeth. In addition, by maximizing the pinion size and number of pinion teeth, service life is further increased.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

[1. A gearset assembly comprising:

a planet pinion carrier;

four long pinions having external gear teeth, mutually spaced angularly about an axis, and supported for rotation on the carrier; and four short pinions having external gear teeth and supported for rotation on the carrier, each short pinion being spaced about the axis, located between two long pinions and meshing with two long pinions, each long pinion meshing with two short pinions.]

[2. The gearset assembly of claim 1, wherein the carrier further comprises a support including:

a disc disposed substantially perpendicular to, and aligned with the axis, having a first set of axially directed, angularly spaced holes, and a second set of axially directed, angularly spaced holes;

posts radially spaced from the axis, extending axially from the disc toward the pinions, each post mutually angularly spaced about the axis; and a pad secured to each post, axially spaced from the disc, extending radially toward the axis, and having a axially directed hole aligned with a hole of the second set of holes.]

[3. The gearset assembly of claim 2, wherein the carrier further comprises a drum aligned with the axis, secured to the pads and the posts, and including a radially outer cylindrical surface.]

[4. The gearset assembly of claim 2, further comprising:

a first group of pinion shafts fitted within a hole of the first set of holes for support on the disc, each pinion shaft of the first group supporting a long pinion for rotation thereon; and a second group of pinion shafts fitted within a hole of the second set of holes for support on the disc, each pinion shaft of the second group supporting a short pinion for rotation thereon, and fitted within a hole on a pad.]

[5. The gearset assembly of claim 2, further comprising:

a first group of pinion shafts fitted within a hole of the first set of holes for support on the disc, each pinion shaft of the first group supporting a long pinion for rotation thereon; and a second group of pinion shafts fitted within a hole of the second set of holes for support on the disc, each pinion shaft of the second group supporting a short pinion for rotation thereon, and fitted within a hole on a pad; and a backing plate disposed substantially perpendicular to, and aligned with the axis, spaced axially from the disc, and having a third set of axially directed, angularly spaced holes, each hole of the third set being aligned with a hole of the first set, for supporting a pinion shaft of the first group on the backing plate.]

[6. The gearset assembly of claim 2, further comprising:

a first group of pinion shafts fitted within a hole of the first set of holes for support on the disc, each pinion shaft of the first group supporting a long pinion for rotation thereon;

a second group of pinion shafts fitted within a hole of the second set of holes for support on the disc, each pinion shaft of the second group supporting a short pinion for rotation thereon, fitted within a hole on a pad, passing axially through a hole of a pad, and including a length portion that extends axially away from the pad; and a backing plate disposed substantially perpendicular to, and aligned with the axis, spaced axially from the disc, and having a third set of axially directed, angularly spaced holes, each hole of the third set of holes being aligned with a hole of the first set of holes, for supporting a pinion shaft of the first group on the backing plate, and having a fourth set of axially directed, angularly spaced holes, each hole of the fourth set being aligned with the length portion of a pinion shaft of the second group of pinion shafts.]

[7. The gearset assembly of claim 2, wherein the carrier further comprises a drum aligned with the axis, secured to the posts, and including a radially outer cylindrical surface; and the drum and support are formed of powered metal and are secured mutually by brazing.]

[8. A gearset assembly comprising:

a pinion carrier;

a first sun gear including external gear teeth;

a second sun gear including external gear teeth;

a ring gear including internal gear teeth;

a planet pinion carrier;

long pinions having external gear teeth, each pinion mutually spaced angularly about an axis, supported for rotation on the carrier, and in meshing engagement with the first sun gear and the ring gear; and short pinions having external gear teeth and supported for rotation on the carrier, each short pinion being spaced about the axis, located between two long pinions and meshing with two long pinions.]

[9. The gearset assembly of claim 8, wherein the carrier further comprises a support including:

a disc disposed substantially perpendicular to, and aligned with the axis, having a first set of axially directed, angularly spaced holes, and a second set of axially directed, angularly spaced holes;

posts radially spaced from the axis, extending axially from the disc toward the pinions, each post mutually angularly spaced about the axis, the posts providing angularly spaced openings between angularly adjacent posts, each opening sized to permit at least a portion of the gear teeth of the long pinions to engage the ring gear; and a pad secured to each post, axially spaced from the disc, extending radially toward the axis, and having of two axially directed holes, aligned with a hole of the second set of holes.]

[10. The gearset assembly of claim 9, wherein the carrier further comprises a drum aligned with the axis, secured to the pads and the posts, and including a radially outer cylindrical surface.]

[11. The gearset assembly of claim 9, further comprising:

a first group of pinion shafts fitted within a hole of the first set of holes for support on the disc, each pinion shaft of the first group supporting a long pinion for rotation thereon; and a second group of pinion shafts fitted within a hole of the second set of holes for support on the disc, each pinion shaft of the second group supporting a short pinion for rotation thereon, and fitted within a hole on a pad.]

[12. The gearset assembly of claim 9, further comprising:

a first group of pinion shafts fitted within a hole of the first set of holes for support on the disc, each pinion shaft of the first group supporting a long pinion for rotation thereon; and a second group of pinion shafts fitted within a hole of the second set of holes for support on the disc, each pinion shaft of the second group supporting a short pinion for rotation thereon, and fitted within a hole on a pad;

a backing plate disposed substantially perpendicular to, and aligned with the axis, spaced axially from the disc, and having a third set of axially directed, angularly spaced holes, each hole of the third set being aligned with a hole of the first set, for supporting a pinion shaft of the first group on the backing plate.]

[13. The gearset assembly of claim 9, further comprising:

a first group of pinion shafts fitted within a hole of the first set of holes for support on the disc, each pinion shaft of the first group supporting a long pinion for rotation thereon;

a second group of pinion shafts fitted within a hole of the second set of holes for support on the disc, each pinion shaft of the second group supporting a short pinion for rotation thereon, fitted within a hole on a pad, passing axially through a hole of a pad, and including a length portion that extends axially away from the pad; and a backing plate disposed substantially perpendicular to, and aligned with the axis, spaced axially from the disc, and having a third set of axially directed, angularly spaced holes, each hole of the third set of holes being aligned with a hole of the first set of holes, for supporting a pinion shaft of the first group on the backing plate, and having a fourth set of axially directed, angularly spaced holes, each hole of the fourth set being aligned with the length portion of a pinion shaft of the second group of pinion shafts.]

[14. The gearset assembly of claim 9, wherein the carrier further comprises a drum aligned with the axis, secured to the posts, and including a radially outer cylindrical surface; and the drum and support are formed of powered metal and are secured mutually by brazing.]

[15. A gearset assembly comprising:

a pinion carrier including a disc disposed substantially perpendicular to, and aligned with the axis, having a first set of axially directed, angularly spaced holes, and a second set of axially directed, angularly spaced holes;

posts radially spaced from the axis, extending axially from the disc toward the pinions, each post mutually spaced angularly about the axis; and a pad secured to each post, axially spaced from the disc, extending radially toward the axis, and having of two axially directed holes, aligned with a hole of the second set, the pads providing axially directed access spaces, each access space being aligned with a hole of the first set of holes;

long pinions having external gear teeth, each pinion mutually spaced angularly about an axis, supported for rotation on the carrier, and located in an access space; and short pinions having external gear teeth and supported for rotation on the carrier, each short pinion being spaced about the axis, located between two long pinions and meshing with two long pinions.]

[16. The gearset assembly of claim 15, wherein the carrier further comprises a drum aligned with the axis, secured to the pads and the posts, and including a radially outer cylindrical surface.]

[17. The gearset assembly of claim 15, further comprising:

a first group of pinion shafts fitted within a hole of the first set of holes for support on the disc, each pinion shaft of the first group supporting a long pinion for rotation thereon; and a second group of pinion shafts fitted within a hole of the second set of holes for support on the disc, each pinion shaft of the second group supporting a short pinion for rotation thereon, and fitted within a hole on a pad.]

[18. The gearset assembly of claim 15, further comprising:

a first group of pinion shafts fitted within a hole of the first set of holes for support on the disc, each pinion shaft of the first group supporting a long pinion for rotation thereon; and a second group of pinion shafts fitted within a hole of the second set of holes for support on the disc, each pinion shaft of the second group supporting a short pinion for rotation thereon, and fitted within a hole on a pad;

a backing plate disposed substantially perpendicular to, and aligned with the axis, spaced axially from the disc, and having a third set of axially directed, angularly spaced holes, each hole of the third set being aligned with a hole of the first set, for supporting a pinion shaft of the first group on the backing plate.]

[19. The gearset assembly of claim 15, further comprising:

a first group of pinion shafts fitted within a hole of the first set of holes for support on the disc, each pinion shaft of the first group supporting a long pinion for rotation thereon;

a second group of pinion shafts fitted within a hole of the second set of holes for support on the disc, each pinion shaft of the second group supporting a short pinion for rotation thereon, fitted within a hole on a pad, passing axially through a hole of a pad, and including a length portion that extends axially away from the pad; and a backing plate disposed substantially perpendicular to, and aligned with the axis, spaced axially from the disc, and having a third set of axially directed, angularly spaced holes, each hole of the third set of holes being aligned with a hole of the first set of holes, for supporting a pinion shaft of the first group on the backing plate, and having a fourth set of axially directed, angularly spaced holes, each hole of the fourth set being aligned with the length portion of a pinion shaft of the second group of pinion shafts.]

[20. The gearset assembly of claim 15, wherein the carrier further comprises a drum aligned with the axis, secured to the posts, and including a radially outer cylindrical surface; and the drum and support are formed of powered metal and are secured mutually by brazing.]

[21. A gearset assembly comprising:

a planet pinion carrier;

four long pinions mutually spaced angularly about an axis, and supported for rotation on the carrier; and four short pinions supported for rotation on the carrier, each short pinion being spaced about the axis, located between two long pinions and meshing with two long pinions.]

[22. The gearset assembly of claim 21, further comprising a first sun gear in meshing engagement with the short pinions; and a second sun gear in meshing engagement with the long pinions.]

[23. The gearset assembly of claim 21, further comprising a ring gear in meshing engagement with the long pinions;

a first sun gear in meshing engagement with the short pinions; and a second sun gear in meshing engagement with the long pinions.]

[24. A gearset assembly comprising:

a planet pinion carrier;

five long pinions mutually spaced angularly about an axis, and supported for rotation on the carrier; and five short pinions supported for rotation on the carrier, each short pinion being spaced about the axis, located between two long pinions and meshing with two long pinions.]

[25. The gearset assembly of claim 24, further comprising a first sun gear in meshing engagement with the short pinions; and a second sun gear in meshing engagement with the long pinions.]

[26. The gearset assembly of claim 24, further comprising a ring gear in meshing engagement with the long pinions;

a first sun gear in meshing engagement with the short pinions; and a second sun gear in meshing engagement with the long pinions.]

*27. A gearset assembly comprising:*

*a sun gear having an axis,*

*a planet pinion carrier;*

*a pair of first pinions having external gear teeth, spaced angularly about the axis, supported for rotation on the carrier and meshing with the sun gear;*

*a second pinion having external gear teeth, supported for rotation on the carrier and meshing with two of the first pinions,*

*wherein a phase error of the gearset, being a function of the number of teeth on reference gears comprising the sun gear, the first pinions and the second pinion, and, for each of the reference gears, an angle between each of two base circle radii and a common tangent to the base circle of the subject reference gear and the base circle of each of the two reference gears meshing with the subject reference gear, is substantially zero.*

*28. The gearset assembly of claim 27, wherein:*

*the sun gear, the pair of first pinions, and the second pinion are arranged symmetrically about a line connecting a center of said second pinion and a center of the sun gear.*

*29. The gearset assembly of claim 27, further comprising:*

*a second pair of first pinions having external gear teeth, spaced angularly about the axis, supported for rotation on the carrier and meshing with the sun gear;*

*a second sun gear concentric with the axis; and*

*wherein said at least one second pinion comprises four second pinions having external gear teeth, supported for rotation on the carrier, each second pinion meshing with two of the first pinions and the second sun gear, the sun gear, one pair of first pinions, and said one second pinion are arranged symmetrically about a line connecting a center of said second pinion and a center of the sun gear.*

*30. The gearset assembly of claim 27, further comprising:*

*a second sun gear concentric with the axis; and*

*wherein each of the first pinions is axially longer than the second pinions and meshes with the second sun gear.*

*31. The gearset assembly of claim 27, further comprising:*

*a second sun gear concentric with the axis; and*

*wherein each of the second pinions is axially longer than the first pinions and meshes with the second sun gear.*

*32. The gearset assembly of claim 27 further comprising:*

*a ring gear having internal teeth; and*

*wherein the second pinions mesh with the ring gear.*

*33. The gearset assembly of claim 27 further comprising:*

*a ring gear having internal teeth; and*

*wherein the first pinions mesh with the ring gear.*

*34. The gearset assembly of claim 27, wherein the carrier further comprises a support including:*

*a disc disposed substantially perpendicular to, and aligned with the axis, having a first set of axially directed, angularly spaced holes, and a second set of axially directed, angularly spaced holes;*

*posts radially spaced from the axis, extending axially from the disc toward the pinions, each post mutually angularly spaced about the axis; and*

*a pad secured to each post, axially spaced from the disc, extending radially toward the axis, and having an axially directed hole aligned with a hole of the second set of holes.*

*35. The gearset assembly of claim 34, further comprising:*

*a first group of pinion shafts fitted within a hole of the first set of holes for support on the disc, each pinion shaft of the first group supporting a first pinion for rotation thereon; and*

*a second group of pinion shafts fitted within a hole of the second set of holes for support on the disc, each pinion shaft of the second group supporting a second pinion for rotation thereon, and fitted within a hole on a pad.*

*36. A gearset assembly comprising:*

*a sun gear having an axis,*

*a planet pinion carrier;*

*four first pinions having external gear teeth, spaced angularly about the axis, supported for rotation on the carrier and meshing with the sun gear; and*

*four second pinions having external gear teeth, supported for rotation on the carrier, each second pinion meshing with two of the first pinions,*

*wherein a phase error of the gearset, being a function of the number of teeth on reference gears comprising the sun gear, the first pinions and the second pinions, and, for each of the reference gears, an angle between each of two base circle radii and a common tangent to the base circle of the subject reference gear and the base circle of each of the two reference gears meshing with the subject reference gear, is substantially zero.*

*37. The gear set of claim 36 wherein the first pinions are spaced mutually at equal angular increments about the axis, and the second pinions are spaced mutually at equal angular increments about the axis.*

*38. A gearset assembly comprising:*

*a first sun gear having an axis,*

*a second sun gear concentric with the axis;*

*a planet pinion carrier;*

*four first pinions having external gear teeth, spaced angularly about the axis, supported for rotation on the carrier and meshing with the first sun gear; and*

*four second pinions having external gear teeth, supported for rotation on the carrier, each second pinion meshing with two of the first pinions and the second sun gear,*

*wherein a phase error of the gearset, being a function of the number of teeth on reference gears comprising the sun gear, the first pinions and the second pinions, and, for each of the reference gears, an angle between each of two base circle radii and a common tangent to the base circle of the subject reference gear and the base circle of each of the two reference gears meshing with the subject reference gear, is substantially zero.*

*39. The gearset assembly of claim 38, wherein:*

*the sun gear, a pair of the first pinions, and one of the second pinion are arranged symmetrically about a center of the sun gear.*

*40. The gearset assembly of claim 38, further comprising:*

*a second pair of first pinions having external gear teeth, spaced angularly about the axis, supported for rotation on the carrier and meshing with the sun gear;*

*a second sun gear concentric with the axis; and*

*wherein said at least one second pinion comprises four second pinions having external gear teeth, supported for rotation on the carrier, each second pinion meshing with two of the first pinions and the second sun gear, the sun gear, one pair of first pinions, and said one second pinion are arranged symmetrically about a center of the sun gear.*

*41. The gearset assembly of claim 38, further comprising:*

*a second sun gear concentric with the axis; and*

*wherein each of the first pinions is axially longer than the second pinions and meshes with the second sun gear.*

*42. The gearset assembly of claim 38, further comprising:*

*a second sun gear concentric with the axis; and*

*wherein each of the second pinions is axially longer than the first pinions and meshes with the second sun gear.*

*43. The gearset assembly of claim 38 further comprising:*

*a ring gear having internal teeth; and*

*wherein the second pinions mesh with the ring gear.*

*44. The gearset assembly of claim 38 further comprising:*

*a ring gear having internal teeth; and*

*wherein the first pinions mesh with the ring gear.*

*45. A method of determining parameters of a gearset assembly that includes a sun gear having an axis; a set of first pinions, mutually spaced angularly about the axis and meshing with the sun gear; and a set of second pinions, each second pinion being spaced about the axis, located between and meshing with two first pinions, each first pinion being located between and meshing with two second pinions, the method comprising the steps of:*

*determining the number of teeth for the sun gear, the first pinions and the second pinions that will enable the gearset to produce at least one desired gear ratio;*

*determining gearset parameters of reference gears that include the first sun gear, a pair of the first pinions and one of the second pinions that meshes with the pair of first pinions;*

*determining for each of the reference gears an angle between each of two base circle radii and a common tangent to the base circle of the subject reference gear and the base circle of each of the two reference gears meshing with the subject reference gear;*

*determining a phase error of the reference gears as a function of the number of teeth on the reference gears and the determined angles; and*

*adjusting at least one parameter of the gearset such that the phase error is substantially zero.*

*46. The method of claim 45 further comprising the step of:*

*adjusting a center distance that extends between at least two of the reference gears such that the phase error is substantially zero.*

* * * * *